July 27, 1954

C. H. O. BERG 2,684,930

MOVING BED SOLIDS CONTACT PROCESS

Filed Aug. 20, 1949

INVENTOR.
CLYDE H.O. BERG,
BY
AGENT.

July 27, 1954  C. H. O. BERG  2,684,930
MOVING BED SOLIDS CONTACT PROCESS
Filed Aug. 20, 1949  2 Sheets-Sheet 2

FIG. 2.

INVENTOR.
CLYDE H. O. BERG
BY
AGENT.

Patented July 27, 1954

2,684,930

UNITED STATES PATENT OFFICE 2,684,930

MOVING BED SOLIDS CONTACT PROCESS

Clyde H. O. Berg, Long Beach, Calif., assignor to Union Oil Company of California, Los Angeles, Calif., a corporation of California Application August 20, 1949, Serial No. 111,552

26 Claims. (Cl. 196—52)

This invention relates to improvements in operations involving contacting of gases or vapors with moving solids. More particularly this invention relates to an improved process and apparatus for the continuous contacting of gases and vapors with a substantially compact moving bed of catalyst or other solids for carrying out chemical reactions. Specifically this invention involves an improved method and apparatus for conveying solids employed in moving bed operations in which the solids are conveyed in substantially compact form under the influence of a concurrently flowing lift gas as hereinafter more fully described.

Operations employing moving beds of substantially compact solids, such as catalysts for chemical reactions, are well known in the art and perhaps the most publicized example is the T. C. C. process for catalytic cracking of hydrocarbons. In this process a regenerator and a reactor are employed in separate vessels, the catalyst being passed in substantially compact form downwardly by gravity through each vessel. A pair of bucket elevators are used to raise the catalyst from the bottom of each vessel for introduction into the top of the other. While elevators of this type are efficient from an energy consumed standpoint, they are somewhat difficult to maintain at the operating temperatures of from 800° F. to 1100° F. and considerable grinding of solids to fines is experienced.

The primary object of the present invention is to provide an improved process and apparatus for carrying out operations involving the contact of gases or vapors with a substantially compact moving bed of solids, or where fluidized particles of oil shale, tar sand and the like are treated for hydrocarbon recovery or where solid particles are merely heat treated such as in lime burning.

A further object of this invention is to provide an improved process and apparatus for the contacting of gaseous or vaporous reactants with a substantially compact moving bed of granular catalyst.

Another object of this invention is to provide operations involving moving beds of solids with an improved method and apparatus for conveying these solids in the absence of elevators or other moving mechanical devices from the bottom of a vessel to the top of the same or different vessel substantially without abrasion or attrition loss.

A more specific object of the present invention is to provide in moving bed operations an improved method for conveying such solids in substantially compact form upwardly through lift lines from the bottom to the top of the same or a different vessel in the presence of a concurrent flow of depressuring lift gas.

A more specific object of the present invention is to provide an improved method for conveying solids involving a concurrent flow of lift gas which also acts as a seal gas for preventing gas flow between the various zones of the vessel or vessels through which the solids are circulated.

An additional object of the present invention is to provide a process and apparatus having the aforesaid improved solids conveyance operation in the refining of fractions of crude petroleum wherein said fractions are contacted at reaction temperature and pressure conditions with a substantially compact moving bed of solids such as a catalyst in such petroleum refining operations as cracking, coking, hydroforming, and desulfurization as well as others.

Other objects and advantages of the present invention will become apparent to those skilled in the art as the description and illustration thereof proceeds.

Briefly, the present invention comprises a method and apparatus in which a continuous downward flow of granular solids in substantially compact form is maintained through a vessel or vessels and through which gaseous or vaporous constituents are passed in direct contact with the solids for chemical conversion or reaction. The granular solids removed from or collecting in the bottom of the vessel are then transferred upwardly in substantially compact form through a lift line or conduit to the top of the same or a different vessel for passage downwardly therethrough in substantially compact form. The upward flow of solids through the lift lines is effected by a concurrent flow of depressuring lift gas, the frictional forces of which, acting against the granular solids by flowing through the interstices thereof, are sufficient to counteract the forces of gravitation and friction of moving solids against the walls of the conduit. The solids are discharged from the upper end of the lift line in such a manner as to maintain their compact condition within the lift line while disengaging the lift gas from the solids without effecting solids suspension in the lift gas. The characteristic of such an operation is that the moving solids are in substantially compact form throughout the entire circuit through which they flow with the one exception of the point below the solids feeder device usually employed but not absolutely necessary in such operations. The function of this feeder is to insure uniform solids flow across the cross sectional area of the vessel or vessels involved and to control the rate of solids circulation. An open gas space usually exists below such a device. Otherwise the solids flowing downwardly through the vessels and upwardly through the lift lines are as a continuous substantially compact solids phase.

In most of the bed operations involving the solids such as catalysts, at least two individual operations or reactions are effected; namely, the reaction step and regeneration step. In the former, the catalyst is contacted with reactants to form products and a spent catalyst and in the latter step the spent catalyst is contacted with some form of a regeneration fluid to form regeneration gases and regenerated solids which are returned to the first step. Often the fluids employed in the regeneration step are not compatable with the fluids being treated in the reaection step and care must always be taken to insure that no mixing of these fluids occurs. This is particularly true in catalytic hydrocarbon cracking operations in which the fluid in the reaction step is gas oil vapor and the fluid in the regeneration step is a mixture of air and flue gas.

It is another characteristic of the present invention that the lift gas mentioned above also forms a seal gas and in this operation prevents the passage of fluids present in the zone from which the solids are withdrawn from flowing through the conveyance means or lift line and mixing with the fluids present in the zone to which the solids are introduced. Thus in a cracking process for example, the oxygen-containing gases in the regeneration zone are not able to flow with the solids through the lift line and mix with the hydrocarbon fluids present in the reaction zone. This is an improved feature since it eliminates the lengthy sealing legs heretofore required in the T. C. C. process and markedly decreases the height of the structure required to support apparatus having a given volumetric throughput.

The present invention is more clearly described in detail in conjunction with the accompanying drawings in which.

Figure 1:
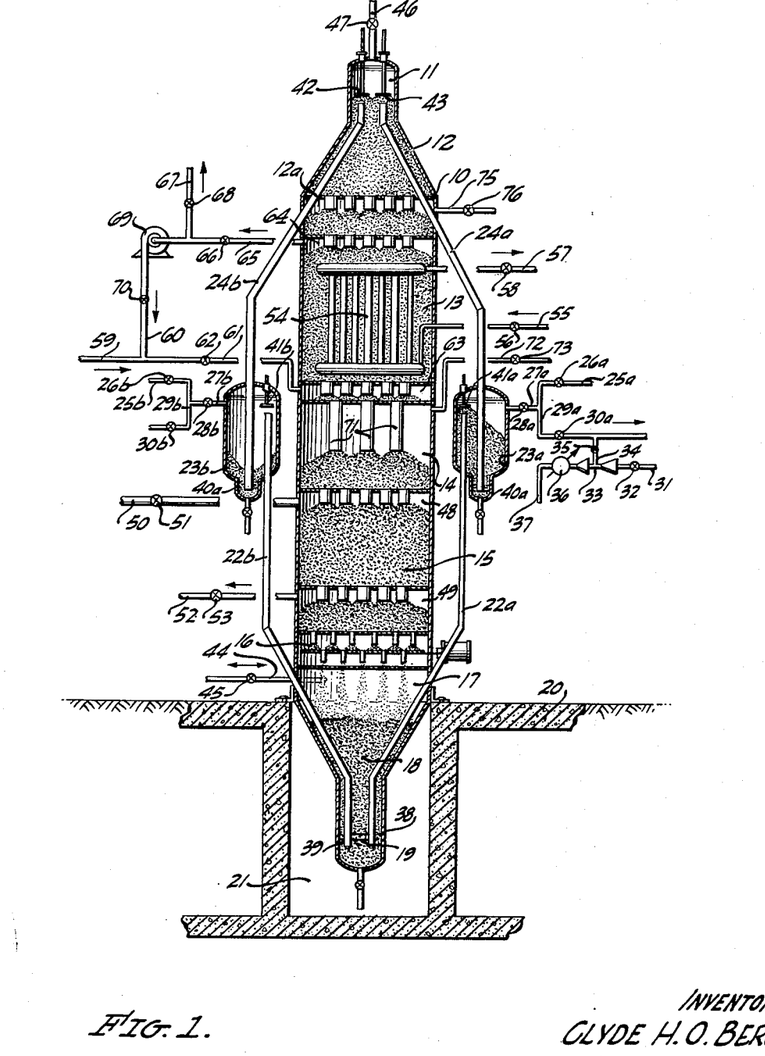
Figure 1 is a vertical cross section view of a single vessel having a reaction zone in the lower portion and a regeneration zone in the upper portion through which the substantially compact solids are passed by gravity.

Referring now more particularly to Figure 1, treating vessel 10 is provided at successively lower levels therein with separator zone 11, upper sealing zone 12 provided with engaging zone 12a, regeneration zone 13, sealing zone 14, reaction zone 15, feeder zone 16, bottom zone 17, lower sealing zone 18 and induction zone 19. Treating vessel 10 is provided with support 20 substantially at ground level and below which the lower portion of the vessel extends into basement 21. The solids accumulating in induction zone 19 after passage through the higher zones in the column are then introduced through restricted openings 19' ($a$ and $b$) and then conveyed via lower lift lines 22 ($a$ and $b$) to intermediate pressuring vessels 23 ($a$ and $b$) when the pressure in these vessels is decreased below the pressure existing in induction zone 19 by the amount of the pressure drop of lift gas flowing through lower lift line 22. The granular solids thus raised from induction zone 19 to intermediate pressuring vessel 23 are subsequently passed through upper lift lines 24 ($a$ and $b$) to separator zone 11 when the pressure in intermediate pressuring vessel 23 is raised above the pressure existing in separator zone 11 by the amount equal to the pressure drop of lift gas flowing through upper lift line 24. Two conveyance apparatuses are shown in Figure 1 and are used in such a sequence of operations that a continuous withdrawal of solids from induction zone 19 and introduction of solids into separator zone 11 is effected. For example, if the pressure of operation of treating vessel 10 is P pounds per square inch and the pressure drop across the upper and lower lift lines is $\Delta p$ pounds per square inch, the pressure in intermediate pressuring zone 23a is $P+\Delta p$ and the pressure in vessel 23b is $P-\Delta p$. Under these conditions part of the lift gas introduced into vessel 23a at a pressure of $P+\Delta p$ passes upwardly through upper lift line 24a carrying solids therethrough and arrives at separator 11 at a pressure of about P. This gas subsequently passes downwardly through upper lift line 24b, which acts as a sealing leg, depressuring from a pressure of P to the pressure of $P-\Delta p$ existing in vessel 23b. The other part of lift gas introduced into vessel 23a passes downwardly through lower lift line 22a, which acts as a sealing leg, depressuring from a pressure of $P+\Delta p$ to a pressure of P in induction zone 19 and then subsequently passes upwardly through lower lift line 22b concurrently with moving solids into vessel 23b at a pressure of $P-\Delta p$. Under these conditions granular solids are removed from induction zone 19 through lower lift line 22b to vessel 23b and from vessel 23a through upper lift line 24a to separator 11. Upper lift line 24b and lower lift line 22a function as sealing legs on this half of the cycle when the pressure in vessel 23a is high and the pressure in vessel 23b is low. When sufficient solids have been introduced into vessel 23b and removed from vessel 23a the pressures then existing in intermediate pressuring vessels 23 are reversed so that the pressure in 23a is $P-\Delta p$ and the pressure in 23b is $P+\Delta p$, then vessel 23a is refilled from induction zone 19 and vessel 23b is emptied into separator 11 while upper lift line 24a and lower lift line 22b function as sealing legs and upper lift line 24b and lower lift line 22a function as lift lines.

Lift gas, which is also used as a sealing gas in the operation above described, is introduced on the high pressure part of the cycle into intermediate pressuring vessel 23 via line 25 controlled by valve 26 and manifold 27 controlled by valve 28. Gas is removed from intermediate pressuring vessels 23 on the low pressure part of the cycle via lines 29 controlled by valve 30.

In low pressure operations in the range of from atmospheric to 30 or 40 pounds per square inch gauge the pressure drop across the lift line sometimes exceeds the operating pressure of the vessel so that $P-\Delta p$ represents a partial vacuum. To remove gases from the intermediate pressuring vessels 23 at these pressures, means such as a barometric condenser and a vacuum pump may be provided or with a steam jet and condenser such as that shown in Figure 1. Here high pressure steam is introduced via line 31 controlled by valve 32 into steam jet 33 and the low pressure gases from vessels 23 pass via line 34 controlled by valve 35 into jet 33. The mixture of steam and low pressure lift gas then pass into condenser 36 from which the condensate and lift gas are withdrawn via line 37 and subsequently separated by means not shown. The low pressure outlets from all the intermediate pressuring vessels 23 connect into the jet ejector system just described. Such a jet ejector is not required in operations where the absolute pressure of operation minus the maximum pressure drop across the lift line is in excess of 15 pounds per square inch absolute.

The solids flow lift line employed in the operations of the present invention are provided with a solids flow check valve in induction zones 19, 40a and 40b. The function of baffles 38 and 39 in induction zone 19 is to prevent an upward flow of solids into sealing zone 18 when a reverse pressure drop exists across the lower lift lines. Such solids check valves are employed in induction zones 40 in the lower portion of intermediate pressuring vessels 23 for prevention of reverse flow downwardly through the upper lift lines 24 into vessels 23 when the pressure gradient is reversed. The function of thrust plates 41 in vessels 23 is also more clearly described therein and suffice it to say here that these thrust plates serve to maintain the moving solids in the lift lines in a compact state. Thrust plates 42 and 43 in separator zone 11 perform the same function by maintaining the solids in upper lift lines 24 in a compact state.

Part of the lift gas may be employed as a seal gas and consequently provision is made for removing a portion of the lift gas passing upwardly from induction zone 19 into bottom zone 17 via line 44 controlled by valve 45. If desired the pressure existing in bottom zone 17 may be controlled to a value just slightly above or below the pressure existing at the bottom of reaction zone 15 so that either a small flow of seal gas into the reaction zone or a small flow of reactant gas from the reaction zone may be maintained for sealing purposes.

At the top of the column means are provided in the form of line 46 controlled by valve 47 for introducing or removing seal gas from separator zone 11. By controlling the amount of gas removed via line 46 the pressure in separator zone 11 may be adjusted to be equal to or slightly above or below the pressure of gas existing at the top of the regeneration zone 13 thereby establishing a seal at the top of the column. Additional quantities of seal gas may be introduced via line 75 controlled by valve 76 and removed from the upper portion of regeneration zone 13 if desired. When more gas is required to lift in one upper lift line than required to seal in the other upper lift line, the seal may be established by removing the excess lift gas via line 75 from zone 12a. A similar relation exists at the bottom of the column.

Reaction zone 15 is included between a pair of engaging or disengaging zones 48 and 49. Zone 48 is provided with line 50 controlled by valve 51 and zone 49 is provided with line 52 controlled by valve 53. Concurrent flow of reactants may be employed by introducing the reactants through line 50 and by removing the products via line 52 and countercurrent contacting may be obtained by introducing the reactants via line 52. Spent catalyst from the reaction zone passes through feeder zone 16 wherein the solids rate through the column is controlled and is conveyed to the top of the column as above described. In cracking processes considerable carbon and coke-like material is deposited on the catalyst and in the regeneration zone this material is burned off by contacting the spent catalyst with the oxygen-containing gas. Other spent solids in other processes may be regenerated under proper conditions according to their requirements.

Regeneration zone 13 is provided with means in the form of a heat transfer unit 54 for removing heat developed during regeneration whereby a cooling medium is brought into indirect contact with the solids during regeneration. Heat transfer unit 54 may also be used for adding heat in an endothermic regeneration if required. This medium may be introduced via line 55 controlled by valve 56 at a low temperature and removed via line 57 as a liquid or vapor controlled by valve 58. The regeneration gas is introduced via line 59, is combined with recirculated gas flowing via line 60, and the diluted gas is passed via line 61 controlled by valve 62 into engaging zone 63. In cracking or coking operations the regeneration fluid is an oxygen-containing gas passed upwardly through the solids in regeneration zone 13 and part of the heated recirculating flue gases are removed from disengaging zone 64 via line 65 controlled by valve 66. Part of this gas is vented via line 67 controlled by valve 68 and the remaining portion is circulated by means of flue gas blower 69 to the oxygen-containing gas inlet via line 60 controlled by valve 70.

Sealing zone 14 is disposed in the middle of the column to prevent the mixing of the regeneration gases in the regeneration zone with the gases being treated in the reaction zone. Sealing zone 14 is provided with a series of narrow extended tubes 71 through which the solids flow from the regeneration zone to the reaction zone. These tubes are of relatively short length 5-15 feet, since excessive pressure drops are not usually required at this point. Line 72 controlled by valve 73 is provided to introduce a seal gas into sealing zone 14 and to control the pressure existing therein. By controlling the pressure to a value just above those existing in the two adjacent zones a flow of gas from the sealing zone into the two adjacent zones may be maintained to prevent mixing of regeneration and reaction gases.

The apparatus in Figure 1 has been described in general terms with regard to the reaction and regeneration steps since the process and apparatus may be applied to processes in which a substantially compact downwardly flowing moving bed of solids is contacted with a gaseous or vaporous stream.

In Figure 1 a modification of the apparatus may be made which in some cases is desirable and which involves the exchange in position of regeneration zone 13 with reaction zone 15. Under these conditions regenerated catalysts or other solids accumulates in the bottom of the column and is conveyed via the lift line described above to the upper portion of the column for passage through the reaction zone. The manner of solids conveyance is substantially the same.

A further modification of the process described and the apparatus disclosed in Figure 1 may be made in which heat transfer means 54 is eliminated from the column. Under some conditions of catalyst regeneration a sufficient quantity of solids are used so that the exothermic heat liberated during regeneration may be absorbed by the solids and removed by gas flow without undue temperature increases as is the condition in hydrocarbon cracking processes when high ratios of catalyst to feed are employed. Further, a series of alternated regeneration gas inlets and flue gas outlets may be employed in the regeneration zone in place of the single outlet and single inlet shown. Such a modification of regeneration zone is shown in Figure 2 and is applicable to the apparatus shown in Figure 1.

Figure 2:
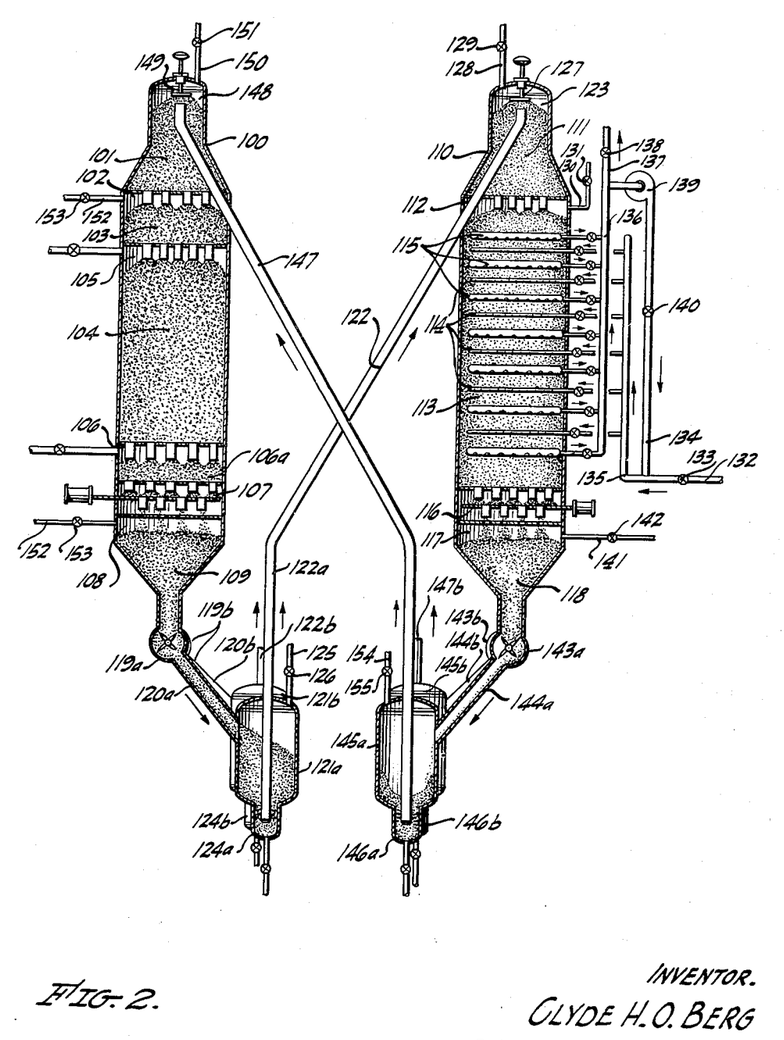
Figure 2 shows a vertical cross section of two vessels: one containing a reaction zone and the other containing a regeneration zone and in which two lift lines are employed for conveyance of the solids.

Referring now more particularly to Figure 2, the improved continuous process and apparatus of this invention is shown in which a separate regeneration and reaction vessel are employed and in which the methods of solids conveyance is slightly modified. Regeneration vessel 100 is provided with upper sealing zone 101, a seal gas outlet or inlet 102, an isolation or pretreating zone 103, reaction zone 104 between reactant engaging zone 105 and product disengaging zone 106 (zones 105 and 106 may be reversed in position depending upon whether countercurrent or concurrent contact is desired), a stripping or post-treating zone 106a, solids feeder zone 107, lower seal gas inlet or outlet 108 and bottom zone 109. Regeneration vessel 110 is provided at successively lower levels therein with upper sealing zone 111, a seal gas engaging or disengaging zone 112 and regeneration zone 113 in which a series of alternated regeneration gas inlets 114 and regeneration gas outlets 115 are disposed. In a lower part of the column is solids feeder zone 116, lower seal gas inlet or outlet zone 117 and bottom zone 118.

Spent solids are passed from reaction zone 104 through star feeders 119 (a and b) which permit a downward flow of solids and prevents any substantially countercurrent flow of gas upward into bottom zone 109. The spent solids then pass via transfer lines 120 (a and b) into spent solids pressuring vessels 121 (a and b). Transfer lines 120 and pressure vessels 121 are usually employed in pairs so that while one vessel is filling the other is emptying via lift line 122 into separator 123 in the upper portion of the regeneration column. Pressuring vessels 121 are each provided with an induction zone 124 (a and b) into which lift lines 122 (a and b) extends. By pressuring pressure vessels 121 to a pressure $P + \Delta p$ with a lift gas, solids are transferred upwardly through lift line 22 as a substantially compact upwardly moving bed of solids concurrently with the lift gas depressuring by an amount $\Delta p$ during the conveyance. Lift gas is introduced via line 125 controlled by valve 126 into pressuring vessel 121. Star valves 119 therefore sustain a maximum pressure differential substantially equal to the $\Delta p$ across lift lines 122. A seal gas is removed or introduced from sealing zone 108 via line 152 controlled by valve 153 depending on whether a pressure below or above that in the reaction zone is desired at this point. Preferably steam or other seal gas is added.

The spent solids introduced via lift lines 122 into induction zone 123 thrust against plate 127 and collect in upper sealing zone 111. If desired, a portion of the lift gas may be withdrawn via line 128 controlled by valve 129 but preferably at least part is allowed to flow concurrently with the solids as a sealing gas through sealing zone 111 into disengaging zone 112 wherefrom it is removed via line 130 controlled by valve 131.

Regeneration vessel 110 is shown equipped with inlet and outlet manifolds such as are required in regenerating spent catalyst from catalytic hydrocarbon cracking operations. An oxygen-containing gas in introduced via line 132 at a rate controlled by valve 133 and is mixed with recirculated flue gases from line 134 to be introduced into regeneration gas inlet manifold 135. From here the gas is introduced into the various inlet zones 114 for passage through the short sections of the spent catalyst bed. The flue gases resulting are collected in flue gas outlet zones 115 which are combined in flue gas manifold 136. A portion of these gases are vented via line 137 controlled by valve 138 while the remainder is recirculated by blower 139 for combination with the entering oxygen-containing gas at a rate controlled by valve 140. Although no means is shown for removing exothermic heat evolved in the regeneration beside direct removal with flue gas, such a means may be incorporated if required. Other forms of regeneration and regeneration fluids may be employed within the scope of this invention as are required by the particular solids being used.

Regenerated catalyst flows through feeder zone 116 through seal gas removal zone 117 from which a seal gas comprising either flue gas or lift gas may be removed or introduced depending upon whether or not a pressure greater or less than the pressure maintained in the regeneration zone is desired at this point. Preferably steam or other seal gas is added. Such gas flow is handled through line 141 controlled by valve 142. The regenerated solids pass through star feeders 143 (a and b) through transfer lines 144 (a and b) into regenerated solids pressuring vessels 145 (a and b). Regenerated solids pressuring vessels 145 are usually employed in pairs so that while one is filling the other may be discharging solids from regenerated solids induction zones 146a via lift lines 147a into separation zone 148 in the upper portion of reaction vessel 100. Lift gas for conveying the regenerated solids is introduced into pressuring vessels 145 via line 154 controlled by valve 155 and the gas is depressured through lift lines 147 in a direction concurrent with the solids into zone 148. Here the solids thrust against thrust plate 149 and the lift gas is either removed via line 150 controlled by valve 151 or allowed to pass concurrently with the solids through upper sealing zone 100 to be removed from zone 102 via line 152 at a rate controlled by valve 153.

In some operations involving moving beds of solids such as catalysts, a third and/or fourth step may be required just prior to or just after the reaction step or the regeneration step. In such cases the concurrent flow of lift gas employed as seal gas in sealing zone 101 and 111 may be dispensed with and any reagent gases necessary in the third or fourth steps may be introduced via zones 102, 108, 112, or 117, so that they pass through the solids in the sealing zones. Such a third step is encountered in such processes as hydro-forming in which a catalyst reduction step is employed after regeneration and prior to reaction and in other processes. Such additional treating steps are contemplated in this invention.

The lift lines employed in the operations described herein are capable of sustaining large pressure drops without encountering difficulties in solids flow, thus it is very convenient to operate reaction zone 104 at as high a pressure as necessary to favor the desired reaction while carrying out the regeneration operations in regeneration zone 113 at as low a pressure as is convenient. It is within the scope of this invention to insert an additional seal gas inlet below the level at which the lift gas discharge solids into separator zones 123 and 148 so that the lift gas may be completely isolated from the reagent gas employed in any third or fourth contacting step.

If desired the combination lift line and pressuring vessel star feeding combination may be substituted for the upper and lower lift lines and intermediate pressure vessel combination shown in and described in conjunction with Figure 1. In such a modification the star feeders are not required and a lifting mechanism having no moving parts is obtained.

Lift gases which are most desirable in the process of the present invention include those with a high density. It has been found that steam, flue gas, normally gaseous hydrocarbons or vapors are adequate lift media for the conveyance of such solids. In other processes in which flue gas is not involved, feed or other gas or vapors may be depressured through the lift lines to bring about the solids conveyance.

No restriction upon the size of the particles which may be conveyed according to this invention is made, for it has been found that particles as small as 100 mesh or smaller, to particles as large as one or two mesh may be efficiently transported in substantially compact form through such lift lines.

The following are typical examples of operations carried out according to the present invention and in which the improved method of solids conveyance above described is employed:

Example I

The hydroforming process is efficiently carried out with the production of high yields of toluene in the presence of a granular catalyst consisting of about 10% molybdenum oxide ($MoO_3$) on a carrier containing 95% alumina and 5% silica. The feed is introduced into the reaction zone in contact with regenerated catalyst at a temperature of 1050° F. and in the presence of 5,000 cubic feet of hydrogen recirculated per barrel of feed. In this case the feed stock was a naphthenic gasoline having a boiling range of from 200° F. to 260° F. A space velocity of between 0.5 and 1.0 volumes of feed per volume of catalyst was employed. The average reaction temperature was 950° F. and the reacted product was removed as a vapor at a temperature of 870° F. from the reaction zone. In the bottom of the reaction zone the spent catalyst was purged of hydrocarbon constituents by a countercurrent flow of steam which also was employed as a lift gas. The spent catalyst was recirculated to the regeneration zone wherein it was contacted with a recirculating stream with oxygen-containing regeneration gas containing a high proportion of flue gas constituents. Regeneration temperature was maintained below a maximum of 1050° F. The regenerated catalyst was then passed from the regeneration zone to a reduction zone wherein it was contacted with a gas rich in hydrogen and following the reduction is passed directly to the reaction zone. The pressure of these operations was 150 to 160 pounds per square inch gauge and pressure drops employed across the lift lines averaged 40 pounds per square inch. The lifting medium employed was 200 pound steam.

Example II

The continuous desulfurization of 850° F. end point coker distillate containing 1.97% sulfur was obtained in the manner of the present invention in which granular catalysts comprising 2% to 3% cobalt oxide and from 8% to 12% molybdenum oxide supported on a 95% alumina, 5% silica catalyst was carried out. The pressure of the desulfurization step was maintained at 1100 pounds per square inch gauge at an average reaction temperature of 810° F. Five thousand cubic feet of hydrogen per barrel of feed were recycled through the reactor and a space velocity of 1.0 volume of feed per volume of catalyst was used. The spent catalyst from this operation contained between 6% to 7% carbonaceous material and was conveyed in the presence of depressuring 1100 pound steam during which conveyance steam was superheated to an average temperature of 790° F. Regeneration was accomplished in the presence of recirculating flue gas into which a small stream of air was introduced to maintain the temperature of the regeneration below a maximum of 1100° F. The regenerated catalyst was withdrawn from the regeneration zone and conveyed to a reduction zone where it was contacted with a hydrogen rich gas prior to being introduced into the reaction zone for reuse. The product from the reaction zone contained 0.13% sulfur.

In the present operation, the ratio of time the catalyst spends in the reaction step to the ratio of time spent in regeneration is exceedingly high of the order of 40 to 1, and consequently the reaction zone and the regeneration zone are designed for a residence time in about this ratio. In large installations in which the reaction zone is very big, part of the catalyst removed from the bottom of the reaction zone may be recirculated through the reaction zone and only part of it conveyed to the regeneration zone for burn-off of carbonaceous deposits.

Example III

The catalytic cracking of a 400° F. to 760° F. straight run gas oil was carried out at a pressure of 25 pounds per square inch gauge and at a temperature which varied from 870° F. to 925° F. The catalyst employed was natural acid treated clay. The feed-to-catalyst ratio on a volume basis was 0.4. The spent catalyst removed from the reaction zone was contaminated with 3½% carbon and was depressured from the bottom of the reaction zone at a pressure of 20 pounds per square inch gauge to a vacuum of −10 pounds per square inch gauge in the intermediate pressuring vessels. The pressure differentials existing across the lift lines averaged 30 pounds per square inch and the catalyst was conveyed from the pressuring vessels to the top of the vessel by introducing 50 pounds per square inch steam at half of the cycle and connecting the intermediate pressuring vessels to a jet ejector maintaining a −10 pound per square inch gauge pressure during the other part of the cycle. The spent catalyst was thus conveyed to the regeneration zone wherein the carbonaceous deposit was burned off in the presence of a recirculated flue gas containing injected air controlled to maintain the temperature in the regenerator below 1050° F. The regenerated catalyst subsequently passed through a sealing zone directly into the reaction zone to contact further quantities of gas oil feed. A 37% conversion to gasoline boiling below 400° F. was obtained.

Example IV

A gas oil cracking operation was carried out in the presence of a synthetic bead alumina-silica catalyst under the conditions given in Example III and in an apparatus like that shown in Figure 1 modified to the extent that the reaction zone was in the upper portion of the vessel and that the regeneration zone was in the lower portion of the vessel. Good yields (30%–39%) of gasoline were obtained and it was found that the bead type catalyst was conveyed as efficiently and with as low attrition losses as the clay type. In all cases the attrition loss of the catalyst was very significantly less than that experienced with bucket elevators.

*Example V*

Using an apparatus similar to that shown in Figure 1, thermal coking of a residual oil was carried out by recirculating 0.25–0.50 inch granules of coke heated to a temperature of 1050° F. and by introducing the preheated residual oil directly into the reaction zone concurrently with the moving solids. An 85% volume yield of coker distillate based on the residual oil feed was obtained. Of the remaining 15% approximately 6% was burned in the regenerator by contacting with a recirculated flue gas to supply heat to the process. Build-up of coke in the system was prevented by producing a stream of excess coke from the bottom of the column. The lift gas employed in this operation was compressed flue gas and an efficient lifting of the coke particles was obtained.

The foregoing examples were intended to be illustrative of the present invention and not to limit the scope of the process and apparatus disclosed.

Because of the magnitude of pressure drops existing through the lift lines it is desirable to compensate for the expansion of the lift gas during the conveyance step. This is done by graduating the cross sectional area of the lift line in the direction of lift gas flow and in proportion to the magnitude of the pressure drop. Thus the constant gas velocity through the lift line is maintained and a smooth efficient transfer of solids results.

The term "substantially compact form" as used in this specification, is intended to refer to a mass of granular solids whose bulk density in weight per unit volume of solids is substantially the same under conditions of handling in the vessels and lift lines described according to this invention as it is when the granular solids are at rest and in the absence of any aeration gas flow which normally would decrease the bulk density from the maximum value at rest and compacted. For example, granular coconut charcoal of 12–30 mesh size, unaerated and at rest in compacted condition may have a bulk density of 32 pounds per cubic foot. When conveyed through the lift lines and according to the methods of this invention, the bulk density of the charcoal does not change appreciably from the above value while passing through the lift line. No aeration occurs as in the well known fluidization processes in which solids are handled as dense phase suspensions having bulk densities of 10 to 40% of the maximum and which suspensions are compressible.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a process for contacting a substantially compact moving bed of granular solids with a stream of fluid which comprises passing a substantially compact moving bed of granular solids downwardly by gravity through a fluid-solids contacting zone and contacting said moving bed in at least part of said contacting zone with a fluid, the improvement which comprises passing said granular solids from said contacting zone into an induction zone, conveying said granular solids in substantially compact form upwardly through a conveyance zone from said induction zone by the step of flowing a conveyance fluid from said induction zone through said conveyance zone at a rate sufficient to cause conveyance of said solids, maintaining the application of a thrust force against the flow of solids issuing from said conveyance zone thereby maintaining the solids therein at substantially the same bulk density as the density of said moving bed of solids passing through said fluid-solids contacting zone, passing the solids thus conveyed from said separator zone into a fluid-solids contacting zone, contacting said solids therein with further quantities of fluid, removing said solids therefrom, and continuing the recirculation of said solids through said zones.

2. In a process for contacting a fluid with a substantially compact moving bed of granular solids which comprises passing a moving bed of substantially compact granular solids downwardly by gravity successively through a reaction zone and a regeneration zone, contacting said solids with a reactant fluid in said reaction zone to form a fluid reaction product and spent solids, and contacting said spent solids in said regeneration zone with a regeneration fluid thereby forming regenerated solids, the improvement which comprises conveying said regenerated solids from said regeneration zone to said reaction zone by passing regenerated solids from said regeneration zone into an induction zone communicating therewith and also communicating via a conveyance zone with said reaction zone, flowing a conveyance fluid from said induction zone through said conveyance zone to said reaction zone at a rate sufficient to effect an upward flow of substantially compact granular solids, maintaining the application of a thrust force against the flow of solids issuing from the outlet opening of said conveyance zone to maintain the solids therein at substantially the same bulk density as the moving bed of solids passing downwardly through said reaction and regeneration zones, and passing the solids into said reaction zone to contact further quantities of reactant fluids.

3. A process according to claim 2 in combination with the step of flowing spent granular solids from said reaction zone through a sealing zone into said regeneration zone while contacting the solids flowing therethrough with a sealing fluid.

4. In a process for contacting a fluid stream with a substantially compact moving bed of granular solids which comprises passing a moving bed of substantially compact granular solids downwardly by gravity successively through a regeneration zone and a reaction zone, contacting said solids with a reactant fluid in said reaction zone to form a reaction product and spent solids and contacting said spent solids in said regeneration zone with a regeneration fluid thereby forming regenerated solids, the improvement which comprises conveying said spent solids from said reaction zone to said regeneration zone by flowing said spent solids from said reaction zone to an induction zone, passing a lift gas from said induction zone through a conveyance zone at a rate sufficient to effect an upward flow of substantially compact granular solids, discharging said solids thus transported from said induction zone into said regeneration zone, maintaining solids in said conveyance zone at substantially the same bulk density as the moving bed of said solids passing downwardly through said reaction and regeneration zones by the step of maintaining the application of a thrust force against the flow of solids issuing therefrom, and passing the solids into said regeneration zone to contact further quantities of said regeneration fluids.

5. A process according to claim 4 in combination with the steps of flowing regenerated solids from said regeneration zone through a sealing zone to said reaction zone and contacting said solids passing through said sealing zone with a sealing fluid.

6. A process for contacting a substantially compact moving bed of granular solids with a hydrocarbon fluid which comprises passing a substantially compact moving bed of granular solids downwardly by gravity through a fluid-solids contacting zone containing a hydrocarbon-solids contacting zone and a solids regeneration zone, contacting said moving bed in said hydrocarbon-solids contacting zone with a hydrocarbon fluid, contacting said solids in said regeneration zone with a regeneration fluid, flowing said solids from said contacting zone into a conveyance zone, conveying said granular solids in substantially compact form upwardly through said conveyance zone by the steps of passing a flow of conveyance fluid upwardly through said conveyance zone at a rate sufficient to convey said solids, maintaining the solids during conveyance within said conveyance zone at substantially the same bulk density as said compact moving bed of solids passing downwardly through said hydrocarbon-solids contacting zone by applying a thrust force continuously against the solids while discharging from said conveyance zone, and flowing the thus conveyed granular solids from said conveyance zone into said hydrocarbon-solids contacting zone.

7. A process for the catalytic cracking of hydrocarbons which comprises passing a compact moving bed of hydrocarbon cracking catalyst downwardly through a contacting zone containing a cracking zone and a catalyst regeneration zone, passing a hydrocarbon cracking stock through said cracking zone under cracking conditions of temperature and pressure forming spent catalyst and a cracked hydrocarbon product, passing a regeneration gas containing oxygen through said regeneration zone forming a regenerated cracking catalyst, flowing cracking catalyst from said contacting zone into a conveyance zone, passing a concurrent flow of conveyance fluid at a rate sufficient to convey said cracking catalyst therewith through said conveyance zone, applying a thrust force continuously to the cracking catalyst discharging from said conveyance zone to maintain said catalyst during conveyance at substantially the same bulk density as the bulk density of said compact moving bed of catalyst passing downwardly through said reaction and regeneration zones, and flowing the conveyed catalyst into said contacting zone for further treatment.

8. A process according to claim 7 wherein said cracking catalyst comprises an acid-treated naturally-occurring clay.

9. A process according to claim 7 wherein said catalyst comprises synthetic silica-alumina cracking catalyst.

10. A process for the thermal coking of hydrocarbons which comprises passing a compact moving bed of granular solids downwardly through a contacting zone containing a coking zone and a solids reheating and regeneration zone, passing a hydrocarbon coking stock through said coking zone under coking conditions of pressure and temperature forming coke-laden solids and a coked hydrocarbon product, passing a regeneration gas containing oxygen through said regeneration and reheating zone forming regenerated reheated solids, flowing solids from said contacting zone into a conveyance zone, passing a flow of conveyance fluid at a rate sufficient to convey said solids therewith through said conveyance zone, applying a thrust force continuously to the solids discharging from said conveyance zone to maintain said solids during conveyance at substantially the same bulk density as the bulk density of said compact moving bed of solids passing downwardly through said reaction and regeneration zones, and flowing the conveyed solids into said contacting zone for further treatment.

11. A process for the catalytic desulfurization of hydrocarbons which comprises passing a compact moving bed of hydrocarbon desulfurization catalyst downwardly through a contacting zone containing a desulfurization zone and a catalyst regeneration zone, passing a sulfur-containing hydrocarbon stock through said desulfurization zone under desulfurizing conditions of temperature and pressure forming spent catalyst and a desulfurized hydrocarbon product, passing a regeneration gas containing oxygen through said regeneration zone forming a regenerated catalyst, flowing desulfurization catalyst from said contacting zone into a conveyance zone, passing a concurrent flow of conveyance fluid at a rate sufficient to convey said catalyst through said conveyance zone, continuously applying a thrust force to the catalyst discharging from said conveyance zone to maintain said catalyst during conveyance at substantially the same bulk density as the bulk density of said compact moving bed of catalyst passing downwardly through said reaction and regeneration zones, and flowing the conveyed catalyst into said contacting zone for further treatment.

12. A process according to claim 11 wherein said desulfurization catalyst comprises a carrier consisting essentially of alumina and with cobalt oxide and molybdenum oxide as the active ingredients.

13. A process for the catalytic reforming of hydrocarbons which comprises passing a compact moving bed of hydrocarbon reforming catalyst downwardly through a contacting zone containing a reforming zone and a catalyst regeneration zone, passing a hydrocarbon stock through said reforming zone under reforming conditions of temperature and pressure forming spent catalyst and a reformed product, passing a regeneration gas containing oxygen through said regeneration zone forming a regenerated catalyst, flowing reforming catalyst from said contacting zone into a conveyance zone, passing a concurrent flow of conveyance fluid at a rate sufficient to convey said catalyst through said conveyance zone, continuously applying a thrust force to the catalyst discharging from said conveyance zone to maintain said catalyst during conveyance at substantially the same bulk density as the bulk density of said compact moving bed of catalyst passing downwardly through said reaction and regeneration zones, and flowing the conveyed catalyst into said contacting zone for further treatment.

14. A process according to claim 13 wherein said catalyst comprises a carrier consisting essentially of alumina and containing molybdenum oxide as the active ingredient.

15. In a process for contacting granular solids with fluids which comprises passing regenerated solids from a first separator zone downwardly through a reaction zone as a substantially compact moving bed by gravity, passing spent solids from a second separator zone downwardly through a regeneration zone as a substantially compact moving bed by gravity, introducing reactant fluids into said reaction zone and removing reaction products therefrom, introducing regeneration fluids into said regeneration zone and removing regeneration products therefrom, the improvement which comprises continuously maintaining a recirculation of granular solids successively through said reaction and regeneration zones by the steps of flowing spent solids by gravity from said reaction zone into a first induction zone, passing a conveyance fluid from said first induction zone through first conveyance zone at a rate sufficient to convey said spent granular solids concurrently therewith into said second separator zone, passing regenerated solids from said regeneration zone by gravity to a second induction zone communicating therewith, passing a conveyance fluid from said second induction zone through a second conveyance zone at a rate sufficient to convey said regenerated solids concurrently therewith to said first separator zone, and continuously applying a force against the flow of solids issuing from each of the outlet openings of said first and second conveyance zones thereby maintaining the solids therein at substantially the same bulk density as the bulk density of the downwardly moving beds of solids passing through said reaction and regeneration zones.

16. A process according to claim 15 wherein a continuous conveyance of spent solids from said reaction zone to said regeneration zone and of regenerated solids from said regeneration zone to said reaction zone is maintained by the steps of alternately passing said conveyance fluid from at least two first induction zones through at least two first conveyance zones communicating therewith, alternately passing said conveyance fluid from at least two second induction zones through at least two second conveyance zones communicating therewith, and operating the plurality of induction zones in sequence so that a continuous removal of solids from said reaction and regeneration zones and a continuous introduction of solids into said separator zones are maintained.

17. A process according to claim 15 in combination with the step of removing a portion of said conveyance fluid at a point between each of said first and second separator zones and the zones respectively communicating therewith to which solids are delivered to establish a seal between said zones.

18. A process for contacting granular solids with hydrocarbon fluids which comprises passing regenerated solids downwardly through a reaction zone in substantially compact form as a moving bed by gravity, passing spent solids downwardly through a regeneration zone in substantially compact form as a moving bed by gravity, passing reactant hydrocarbon fluids through said reaction zone in direct contact with said regenerated solids to form spent solids and hydrocarbon reaction products, passing regeneration fluids through said regeneration zone in direct contact with spent solids therein to form regenerated solids and continuously maintaining a recirculation of granular solids successively through said reaction and regeneration zones by the steps of flowing spent solids by gravity from said reaction zone into a first conveyance zone, passing a flow of conveyance fluid through said first conveyance zone concurrently with and at a rate sufficient to convey said spent granular solids, flowing the thus conveyed spent solids into said regeneration zone, flowing regenerated solids from said regeneration zone into a second conveyance zone, passing a flow of lift gas through said second conveyance zone concurrently with and at a rate sufficient to convey said regenerated solids, discharging said regenerated solids into said contacting zone, and maintaining the spent solids flowing through said first conveyance zone and the regenerated solids flowing through said second conveyance zone at substantially the same bulk density as said compact moving beds of granular solids passing downwardly through said reaction and regeneration zones by applying a thrust force continuously against the solids while discharging from each of the outlet openings of said first and second conveyance zones.

19. A process for the catalytic cracking of hydrocarbons which comprises passing regenerated cracking catalyst downwardly by gravity as a substantially compact moving bed through a cracking zone, passing spent catalyst downwardly by gravity as a substantially compact moving bed through a regeneration zone, flowing a hydrocarbon cracking stock through said reaction zone under hydrocarbon cracking conditions of pressure and temperature forming a spent catalyst and a cracked product, flowing a regeneration gas containing oxygen through said regeneration zone forming regenerated catalyst and continuously maintaining a circulation of granular cracking catalyst successively through said reaction and regeneration zones by the steps of flowing spent catalyst from said reaction zone into a first conveyance zone, passing a flow of conveyance fluid therethrough at a rate sufficient to convey said spent catalyst, flowing the thus conveyed spent catalyst into said regeneration zone, flowing regenerated catalyst from said regeneration zone into a second conveyance zone, passing a flow of conveyance fluid through said second conveyance zone at a rate sufficient to convey said regenerated catalyst, flowing the thus conveyed catalyst into said reaction zone, and continuously applying a separate thrust force to the cracking catalyst discharging from each of said first and second conveyance zones thereby maintaining the catalyst during conveyance at a bulk density substantially the same as that of the compact moving beds of catalyst passing downwardly through said reaction and regeneration zones.

20. A process according to claim 19 wherein said catalyst comprises an acid-treated naturally-occurring clay.

21. A process according to claim 19 wherein said catalyst comprises a synthetic silica-alumina cracking catalyst.

22. A process for the thermal coking of hydrocarbons which comprises passing regenerated and heated solid granules downwardly by gravity as a substantially compact moving bed through a coking zone, passing coke-laden solids downwardly by gravity in substantially compact form through a regeneration and reheating zone, flowing a hydrocarbon coking stock through said coking zone under coking conditions of temperature and pressure forming said coke-laden solids and a coked product, flowing a regeneration gas containing oxygen through said regeneration and reheating zone forming reheated solids and continuously maintaining a circulation of such solids successively through said coking and reheating zones by the steps of flowing coke-laden solids from said coking zone into a first conveyance zone, passing a flow of conveyance fluid therethrough concurrently with and at a rate sufficient to convey said coke-laden solids, flowing the thus conveyed solids into said reheating zone, flowing reheated solids from said regeneration zone into a second conveyance zone, passing a flow of conveyance fluid through said second conveyance zone concurrently with and at a rate sufficient to convey said reheated solids, flowing the thus conveyed solids into said reaction zone, and continuously applying a thrust force to the solids discharging from each of said first and second conveyance zones thereby maintaining the solids during conveyance at a bulk density substantially the same as that of the compact moving beds of solids passing through said reaction and regeneration zones.

23. A process for the catalytic desulfurization of hydrocarbons which comprises passing regenerated desulfurization catalyst downwardly by gravity as a substantially compact moving bed through a desulfurization zone, passing spent catalyst downwardly by gravity as a substantially compact moving bed through a regeneration zone, flowing a sulfur-containing hydrocarbon stock through said reaction zone under desulfurization conditions of temperature and pressure forming a spent catalyst and a desulfurized hydrocarbon product, flowing a regeneration gas containing oxygen through said regeneration zone forming a regenerated catalyst, and continuously maintaining a circulation of granular desulfurization catalyst successively through said desulfurization and regeneration zones by the steps of flowing spent catalyst from said desulfurization zone into a first conveyance zone, passing a flow of conveyance fluid therethrough concurrently with and at a rate sufficient to convey said spent catalyst, flowing the thus conveyed spent catalyst into said regeneration zone, flowing regenerated catalyst from said regeneration zone into a second conveyance zone, passing a flow of conveyance fluid through said second conveyance zone concurrently with and at a rate sufficient to convey said regenerated catalyst, flowing the thus conveyed catalyst into said desulfurization zone, and continuously applying a thrust force to the desulfurization catalyst discharging from each of said first and second conveyance zones thereby maintaining the catalyst during conveyance at a bulk density substantially the same as that of the compact moving beds of catalyst passing through said desulfurization and regeneration zones.

24. A process according to claim 23 wherein said desulfurization catalyst comprises a carrier consisting essentially of alumina and containing cobalt oxide and molybdenum oxide as the active desulfurizing ingredients.

25. A process for the catalytic reforming and aromatization of hydrocarbons which comprises passing regenerated reforming catalyst downwardly by gravity as a substantially compact moving bed through a reforming zone, passing spent catalyst downwardly by gravity in substantially compact form through a regeneration zone, flowing a hydrocarbon reforming stock through said reforming zone under reforming conditions of temperature and pressure forming a spent catalyst and a reformed aromatic hydrocarbon product, flowing a regeneration gas containing oxygen through said regeneration zone forming regenerated catalyst and continuously maintaining a circulation of granular reforming catalyst successively through said reforming and regeneration zones by the steps of flowing spent catalyst from said reforming zone into a first conveyance zone, passing a flow of conveyance fluid therethrough concurrently with and at a rate sufficient to convey said spent catalyst, flowing the thus conveyed spent catalyst into said regeneration zone, flowing regenerated catalyst from said regeneration zone into a second conveyance zone, flowing a flow of conveyance fluid through said second conveyance zone concurrently with and at a rate sufficient to convey said regenerated catalyst, flowing the thus conveyed catalyst into said reforming zone, and continuously applying a thrust force to the reforming catalyst discharging from each of said conveyance zones thereby maintaining the catalyst during conveyance at a bulk density substantially the same as that of the compact moving beds of catalyst passing through said reforming and regeneration zones.

26. A process according to claim 25 wherein said reforming catalyst comprises an alumina carrier containing molybdenum oxide as the active reforming ingredient.

References Cited in the file of this patent

UNITED STATES PATENTS

| Number | Name | Date |
| --- | --- | --- |
| 2,407,700 | Huff | Sept. 17, 1946 |
| 2,411,996 | Kassel | Dec. 3, 1946 |
| 2,413,479 | Wiegand | Dec. 31, 1946 |
| 2,414,373 | Gerhold | Jan. 14, 1947 |
| 2,418,679 | Utterback | Apr. 8, 1947 |
| 2,440,475 | Jacomini | Apr. 27, 1948 |
| 2,487,961 | Angell | Nov. 15, 1949 |
| 2,488,030 | Scheineman | Nov. 15, 1949 |
| 2,509,983 | Morrow | May 30, 1950 |
| 2,541,077 | Leffer | Feb. 13, 1951 |
| 2,542,887 | Watson | Feb. 20, 1951 |
| 2,547,015 | Kirkbride | Apr. 3, 1951 |
| 2,561,771 | Ardern | July 24, 1951 |

OTHER REFERENCES

"Houdriflow," Oil and Gas Journal, Jan. 13, 1949, vol. 47, pages 78 and 79.